(12) United States Patent
Hämmerle et al.

(10) Patent No.: US 8,879,879 B2
(45) Date of Patent: Nov. 4, 2014

(54) OPTICAL FIBER, IN PARTICULAR A LASER FIBER CONTAINING A DOPED GLASS FIBER CORE AND CLADDING AROUND THE FIBERGLASS CORE

(75) Inventors: Wolfgang Hämmerle, Jena (DE); Lothar Brehm, Jena (DE); Matthias Auth, Essen (DE); Elke Poppotz, Jena (DE)

(73) Assignee: J-Fiber GmbH, Jena (DE)

( * ) Notice: Subject to any disclaimer, the term of this patent is extended or adjusted under 35 U.S.C. 154(b) by 139 days.

(21) Appl. No.: 13/320,440

(22) PCT Filed: Jun. 9, 2010

(86) PCT No.: PCT/EP2010/058045
§ 371 (c)(1),
(2), (4) Date: Nov. 14, 2011

(87) PCT Pub. No.: WO2010/142706
PCT Pub. Date: Dec. 16, 2010

(65) Prior Publication Data
US 2012/0063733 A1 Mar. 15, 2012

(30) Foreign Application Priority Data
Jun. 12, 2009 (DE) .................. 10 2009 025 168

(51) Int. Cl.
| | | |
|---|---|---|
| G02B 6/02 | (2006.01) | |
| C03B 37/018 | (2006.01) | |
| G02B 6/036 | (2006.01) | |
| H01S 3/067 | (2006.01) | |

(52) U.S. Cl.
CPC ...... C03B 37/01861 (2013.01); G02B 6/03694 (2013.01); C03B 37/01838 (2013.01); C03B 37/01869 (2013.01); C03B 2201/10 (2013.01); C03B 2201/12 (2013.01); C03B 2201/28 (2013.01); C03B 2201/36 (2013.01); C03B 2201/40 (2013.01); G02B 6/03633 (2013.01); G02B 6/03638 (2013.01); H01S 3/06708 (2013.01)
USPC .......................................... 385/127; 385/123

(58) Field of Classification Search
USPC ............... 385/123, 126–127, 141–143; 372/6
See application file for complete search history.

(56) References Cited

U.S. PATENT DOCUMENTS 5,491,581 A * 2/1996 Roba ......................... 359/341.3
5,778,129 A * 7/1998 Shukunami et al. .......... 385/127
(Continued)

FOREIGN PATENT DOCUMENTS

| EP | 1 035 083 | 9/2000 |
| GB | 2 273 389 | 6/1994 |
| WO | WO 03/062881 | 7/2003 |

OTHER PUBLICATIONS

Kirchhof et al. "Materials for high-power fiber lasers". *Journal of Non-Crystalline Solids*, vol. 352, No. 23-25 Jul. 15, 2006, pp. 2399-2406, 2006.
Chen. "Foundations for guided-wave optics" *Wiley Interscience*, 2007, p. 283.
Brown et al. "Thermal, Stress, and Thermo-Optic Effects in High Average Power Double-Clad Silica Fiber Lasers". *IEEE Journal of Quantum Electronics*, vol. 37, Feb. 2, 2001, pp. 207-217.

(Continued)

*Primary Examiner* — Daniel Petkovsek
(74) *Attorney, Agent, or Firm* — Hamre, Schumann, Mueller & Larson, P.C.

(57) ABSTRACT

The invention relates to an optical fiber, in particular a laser fiber, containing a doped glass fiber core (1) and cladding (2) around the latter with a refraction index profile which decreases outwards from the fiber core. The optical fiber is distinguished by at least one intermediate layer (3, 4, 5) being disposed between the glass fiber core and the cladding to reduce the mechanical tension therebetween. In one advantageous embodiment, the intermediate layer is doped in such a way as to ensure a stepped mechanical tension distribution between the glass fiber core and the cladding, and is co-doped in such a way as to reduce the refractive index and counteract the refraction index-increasing effect of the intermediate layer doping. The invention further relates to an application of at least one doped barrier layer to a core region during preparation of the preform to avoid diffusion of special core dopants from the core during the collapse process, and to allow the diffusion of special dopants between the barrier layer and the core layer.

17 Claims, 5 Drawing Sheets

(56) References Cited

U.S. PATENT DOCUMENTS

| | | | |
|---|---|---|---|
| 6,175,445 B1 * | 1/2001 | Desthieux et al. | 359/341.5 |
| 6,280,850 B1 * | 8/2001 | Oh et al. | 428/428 |
| 6,690,868 B2 * | 2/2004 | Anderson et al. | 385/123 |
| 8,620,126 B2 * | 12/2013 | Rajala et al. | 385/127 |

OTHER PUBLICATIONS

De Araujo et al. "Sol-gel preparation of $AlPO_4$—$SiO_2$ glasses with high surface mesoporous structure". *Journal of Materials Chemistry*, No. 16, 2006, pp. 1323-1331.

* cited by examiner

OPTICAL FIBER, IN PARTICULAR A LASER FIBER CONTAINING A DOPED GLASS FIBER CORE AND CLADDING AROUND THE FIBERGLASS CORE

FIELD OF THE INVENTION

The invention relates to an optical fiber, in particular, a laser fiber, containing a doped glass fiber core and a cladding enclosing the glass fiber core, and a method for fabricating an optical fiber, in particular, a laser fiber, containing a doped glass fiber core and a cladding enclosing the glass fiber core.

BACKGROUND

Optical fibers, in particular laser fibers, comprise in general a glass fiber core and at least one cladding, which serves as the pump core in laser fibers. Furthermore, this construction is protected against environmental influences by a polymer coating. The glass fiber core and the cladding are made chemically in essence of silicon oxide. In order to ensure the wave guidance of the pump core, the polymer coating is made of a material having a refractive index that is less than the refractive index of silicon oxide.

In the case of the laser fibers known from the prior art, the glass fiber core is doped with at least one rare earth element and at least one additional dopant. The additional dopant(s) serves (serve) as a solubilizer for the rare earth element in the silicon oxide-based glass matrix and is (are) supposed to have a beneficial effect on the additional properties of the fiber, in particular a so-called photodarkening effect.

Optical fibers, in particular laser fibers, usually exhibit a graduated refractive index profile in their core. In this case the core can consist of multiple core layers. The core layers are fabricated, for example, by a process for chemical gas phase deposition in combination with the impregnation process. However, the high complexity of the fabrication process allows the depositions of only a few core layers. Therefore, for production related reasons graduated core refractive index profiles can be realized only with extreme effort and cost and at a very low yield and, thus, for all practical purposes are not used.

The solubility of rare earth elements in pure silicon oxide is typically limited to a few 100 mol-ppm, but can be improved with the use of solubilizers, such as aluminum or phosphorus. Therefore, solubilizers are in general customary and necessary as co-dopants in the core area of rare earth-doped laser fibers. However, the dopants that are used as solubilizers cause together with the doped rare earth element mechanical stresses at the preform core interface or more specifically at the fiber core interface. Such stresses at higher solubilizer concentrations or more specifically rare earth element concentrations result in undesired glass defects during the fabrication and processing of the optical fiber. Predominantly mechanical stresses occur at the interface between the core and the cladding and can result in the destruction of the preform or more specifically the fiber.

Furthermore, optical fibers, which are provided as the laser fibers for the high power range; have to be configured in such a way that the undesired non-linear optical effects, such as the so-called Raman or the so-called Brillouin effect, are suppressed. In the simplest case this is done by keeping the laser fiber as short as possible, because the intensity of many non-linear effects scales with the length of the laser fiber.

In order to realize short fiber lengths of typically 10 m for a laser fiber for the high power range, the absorption in the cladding has to be as high as possible and amount to, for example, 1.5 dB/m. The required high cladding absorption can be achieved, in principle, in two ways:

1. A high core absorption of the laser fiber is targeted. This goal is achieved by means of a high rare earth concentration in the laser core.
2. The smallest possible ratio between the cladding area and the core area is realized.

In the interest of a large area for coupling the pump radiation into the pump core or more specifically the cladding, the cross sectional area of the core has to increase correspondingly. However, any effort to enlarge the core area is impeded by technological constraints. First of all, when enlarging the core cross section it must be observed that the so-called single mode operation of the core and, thus, the resulting good beam quality is maintained. Therefore, as the core area increases, the numerical aperture of the laser core has to be decreased according to the equation $$2\pi \cdot a \cdot NA/\lambda = \text{const.}$$

where $a$ is the radius of the core; $NA$ is its numerical aperture; and $\lambda$ is the wavelength of the light to be guided in the core. Fibers having a relatively large core diameter and a relatively small numerical aperture of the core are typically called large mode area fibers (LMA fibers). However, any effort to decrease the numerical aperture to values below approximately 0.05 is impeded by technological constraints, especially if the chemical gas phase deposition process is used in combination with the impregnation doping process.

As the core absorption increases with an increase in the rare earth concentration, the refractive index of the core also increases, because rare earth elements act as refractive index increasing dopants. In addition, rare earth compounds—in particular, ytterbium-III oxide $Yb_2O_3$ which is typically used in high power laser fibers—have an especially high coefficient of thermal expansion compared to other commonly used core dopants (F. Just, H.-R. Müller, H-Bartelt; Mechanical stresses in rare-earth doped fiber preforms, German Society of Applied Optics DGaO [*Deutsche Gesellschaft für angewandte Optik*, German Branch of the European Optical Society] Proceedings 2008).

For example, the coefficient of thermal expansion of $Yb_2O_3$ at a value of $4.1 \times 10^{-7}$ $(K \cdot mol\%)^{-1}$ is significantly higher than the thermal expansion coefficient of the co-dopants that are commonly used—$Al_2O_3$, $P_2O_5$, $GeO_2$, $B_2O_3$. A high ytterbium doping in the core area generates such high mechanical stresses compared to the undoped cladding area that the preform or more specifically the fiber core can burst during the cooling phase.

The change in the thermal expansion coefficient based on the dopant concentration is shown for a variety of dopants in the following table:

| Dopant | Change in the thermal expansion coefficient based on the dopant concentration |
| --- | --- |
| $Yb_2O_3$ | $4.1 \times 10^{-7}$ $1/(K \cdot mol\%)$ |
| $P_2O_5$ | $1.5 \times 10^{-7}$ $1/(K \cdot mol\%)$ |
| $Al_2O_3$ | $0.53 \times 10^{-7}$ $1/(K \cdot mol\%)$ |
| $SiF_4$ | $-0.5 \times 10^{-7}$ $1/(K \cdot mol\%)$ |

Figure 1:
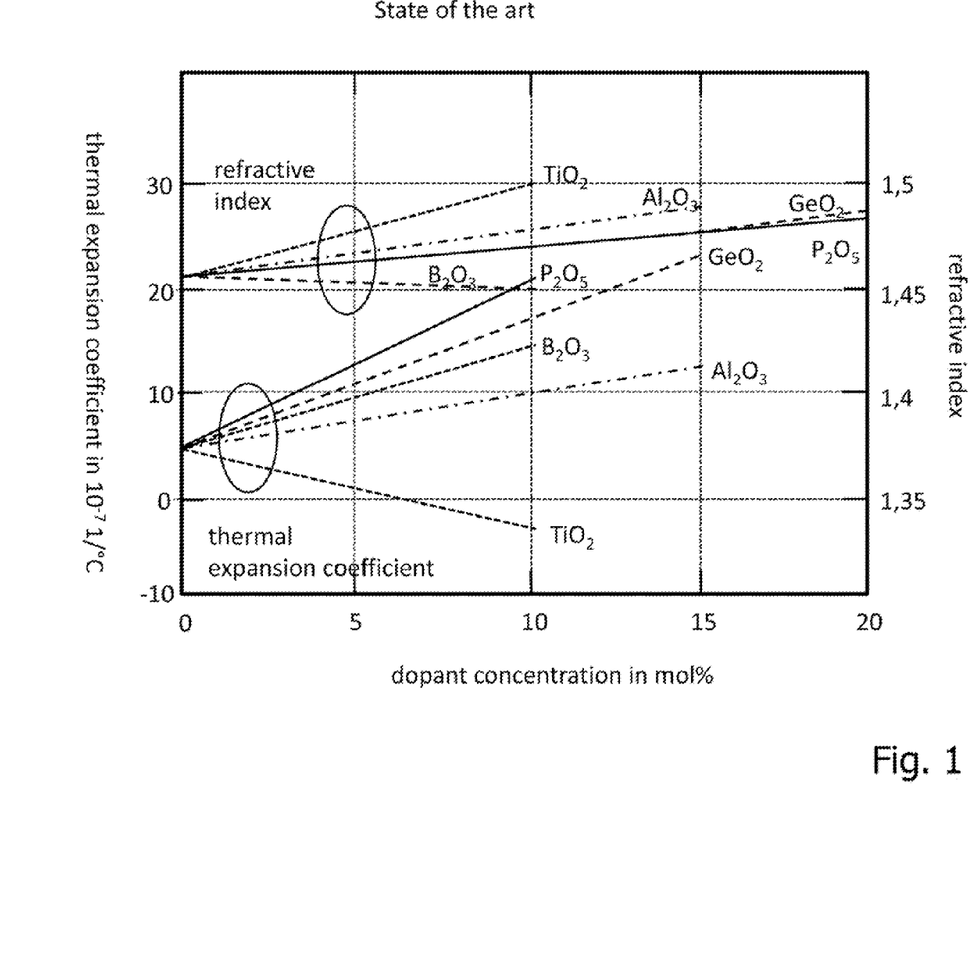
FIG. 1 is a graph showing relationships between the refractive index and the thermal expansion coefficient of a doped silicon glass for a variety of co-dopants.
Figure 2:
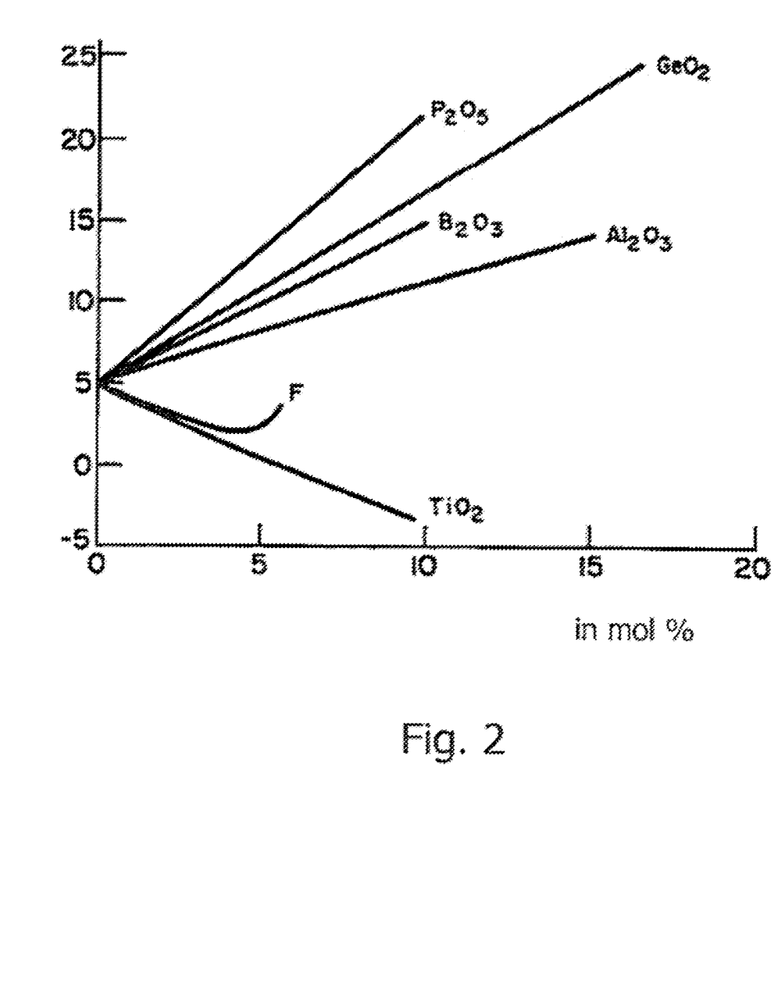
FIG. 2 is similar to FIG. 1 for doped quartz glass.

An exemplary overview of the relationship between the refractive index and the thermal expansion coefficient of a doped silicon glass is shown for a variety of co-dopants in FIG. 1 (Chin-Lin Chen, Foundations for guided-wave optics, Wiley Interscience 2007, p. 283). FIG. 2 shows exemplary thermal expansion coefficients for doped quartz glass as a function of a few co-dopants.

Furthermore, laser fibers, which are intended for use in the high power range, must be distinguished by low photodarkening losses, in order to be able to work in a stable way for a long time. In order for a laser fiber to show low photodarkening, the laser core is doped not only with the rare earth elements in general, but also with at least one additional co-dopant. In this context high $Al_2O_3$ and/or $P_2O_5$ concentrations (3 to 10 mol %) have proven to be especially good (S. Jetschke, Photodarkening in Yb doped Optical Fibers, Institute of Photonic Technology [IPHT] Presentation, Jun. 13, 2008). In order to ensure an adequately high solubility of the rare earth elements in the glass matrix, sufficiently large quantities of co-dopants, such as $Al_2O_3$ or $P_2O_5$, are also necessary.

When the laser is operating at a high laser output power (1800 W), the laser fibers in the core area reach temperatures of up to approximately 634° C. and above (D. C. Brown, H. J. Hoffmann, Thermal, Stress, and Thermo-Optic Effects in High Average Power Double-Clad Silica Fiber Lasers, IEEE Journal of Quantum Electronics, Vol. 37, 2 Feb. 2001, pp. 207-217). The resulting heat that is generated in the fiber core has to be dissipated. Therefore, high power fibers are usually cooled actively or passively from the outside, in order to dissipate the heat generated in the core area and to prevent thermal destruction of the outer polymer coating. However, the outer cooling and the high thermal load in the fiber core cause in turn high thermal stresses, which are generally intensified by the dopants and which may result in the mechanical destruction of the fiber core.

The rupturing of the fiber core is promoted in fibers, which as core glass $Al_2O_3$—$P_2O_5$—$Yb_2O_3$—$SiO_2$ due to the high crystallization tendency of species of the type $AlPO_4$ and/or $Al(OP)_4$ or $P(OAl)_4$ of the core glass, especially during prolonged cooling. Therefore, it is possible for crystallization and stress induced destruction of the fiber core to occur as early as during the fabrication of the preform or during the subsequent fiber drawing process (C. C. de Araujo, L. Zhang, H. Eckert, Sol-gel preparation of $AlPO_4$—$SiO_2$ glasses with high surface mesoporous structure, J. Mater. Chem. 2006, No. 16, pp. 1323-1331). The mechanical stresses in the core/cladding interface can generate crystalline nuclei that form the conditions for glass crystallization and become apparent especially with respect to the negative effect of photodarkening.

SUMMARY OF THE INVENTION

On the basis of the aforesaid, the object of the present invention is to provide an optical fiber, in particular a laser fiber, comprising a doped glass fiber core and a cladding enclosing the glass fiber core, so that the aforementioned fractures and destructive processes are avoided and that a high operating stability of the fiber can be achieved even over long operating periods.

The invention achieves this engineering object with an optical fiber, in particular a laser fiber, containing a doped glass fiber core and a cladding enclosing the glass fiber core. With respect to the process related aspect the engineering object is achieved with a method for fabricating an optical fiber, in particular a laser fiber, containing a doped glass fiber core and a cladding enclosing the glass fiber core. The dependent claims contain the respective practical and/or advantageous embodiments of the optical fiber and/or the fabrication method.

Provided is an optical fiber, in particular a laser fiber, containing a doped glass fiber core and a cladding enclosing the glass fiber core, with a refractive index profile that decreases outwards from the fiber core. According to the invention, this configuration is distinguished by at least one intermediate layer disposed between the glass fiber core and the cladding and/or an intermediate layer that is disposed between the glass fiber core and a tube interior of an intermediate product and that reduces the mechanical stresses between the glass fiber core and the cladding.

The optical fiber according to the invention is based on the idea of trapping the mechanical stresses between the necessarily doped glass fiber core and the undoped cladding and/or between the glass fiber core layer and the tube interior surface of the intermediate product by inserting at least one intermediate layer between the aforementioned two layers, whose properties are specified in principle. This intermediate layer bonds with the glass fiber core and/or the cladding and, in so doing, absorbs and smoothes out the mechanical stresses between these two layers or more specifically at the interfaces and, thus, stabilizes, on the whole, the entire fiber configuration.

In addition, the at least one intermediate layer has expediently an intermediate layer doping that guarantees a graduated mechanical stress profile between the glass fiber core and the cladding. At the same time the at least one intermediate layer has an intermediate layer co-doping that counteracts a refractive index-increasing effect of the intermediate layer doping.

Therefore, this embodiment makes it possible to divide the mechanical stresses at the interface between the glass fiber core and the cladding or more specifically the tube interior surface into a first, non-destructive partial stress between the glass fiber core and the at least one intermediate layer, on the one hand, and into a second, non-destructive partial stress between the at least one intermediate layer and the cladding or the tube interior surface, on the other hand. In contrast to the conventional fiber design, in the present case the entire interface stress between the fiber core and the cladding is divided over the space of the intermediate layer.

For this purpose the at least one intermediate layer has the intermediate layer doping that imparts to the intermediate layer the mechanical nature necessary for this function. In order to compensate for the resulting increase in the refractive index in the intermediate layer and, thus, to guarantee an unaffected light guidance in the glass fiber core, the intermediate layer is provided with an intermediate layer co-doping that does not affect the mechanical properties of the intermediate layer, but rather collects only the refractive index of the intermediate layer to a value that is necessary for guiding the light in the fiber.

In particular, the at least one intermediate layer has a thermal expansion coefficient exhibiting a value ranging between a value of the coefficient of expansion of the glass fiber core and a value of a coefficient of expansion of the cladding. The resulting thermal expansion profile between the glass fiber core over the intermediate layer into the cladding induces an increase in the thermal stability of the optical fiber altogether and results in a higher mechanical stability of the fiber during a subsequent external cooling process.

In a practical embodiment the glass fiber core exhibits a core doping with a core dopant, containing at least one active laser medium, preferably a rare earth element and/or a d-group element, and a solubilizer. In this embodiment the core dopant is ytterbium oxide; and/or the solubilizer is an oxide of an element of the third and/or fifth main group.

In one embodiment the intermediate layer doping contains an intermediate layer dopant in the form of an oxide of an element of preferably the third and/or the fifth main group;

and the intermediate layer co-doping contains an intermediate layer co-dopant in the form of a halogenide, preferably a fluoride.

In one practical embodiment there are two intermediate layers. In this case the values of the thermal expansion coefficients of the first intermediate layer and the second intermediate layer have a graduated profile. At the same time a different ratio between the intermediate layer dopant and the intermediate layer co-dopant is provided in the first and the second intermediate layer.

In such a case an additional interface, at which the mechanical stresses are further divided, is provided within the area of the intermediate layers. In addition, both intermediate layers exhibit different thermal expansion coefficients with values that are adjusted by means of the intermediate layer dopants. Since in this case the intermediate layer co-dopants compensate for the refractive indices, which are affected by the intermediate layer dopants, in both intermediate layers, said two intermediate layers exhibit different ratios between the two doping components.

In an additional embodiment at least one diffusion zone, in which at least one ingredient is diffused into or from the core layer, is formed between the at least one intermediate layer and the provided core layer. In this embodiment the at least one intermediate layer serves, in addition to its stabilizing and stress compensating effect, to have a specific chemical, effect on at least one section of the core layer and either to introduce there the ingredients by diffusion or to deplete the core layer specifically of these ingredients. This approach can achieve additional optical advantages, especially with respect to the numerical aperture and the refractive index profile form of the core of the optical fiber.

In one embodiment the concentration of the ingredient exhibits a radial gradient. However, it is also possible that in another embodiment the core is uniformly permeated by the ingredient. In such a case the diffusion layer practically fills the entire core layer.

The intermediate layer can also be configured as just a temporary barrier layer during the fabrication process of the optical fiber. In one inventive method for fabricating an optical fiber, in particular a laser fiber, containing a doped glass fiber core and a cladding enclosing the glass fiber core, with a refractive index profile that decreases outwards from the fiber core, the invention provides that a preform is fabricated with a temporary intermediate layer in the form of a barrier layer, for which the following process steps are carried out:

In a first sequence of steps at least one doped soot layer exhibiting a specified soot dopant concentration is deposited. The soot layer is subjected to a hot temperature step in order to adjust a defined degree of sintering. Then doping takes place with additional dopants dining the so-called impregnation doping process. Before the second fabrication segment begins, the doped porous layer is oxidized and consolidated. In a second sequence of steps a doped barrier layer having a banner dopant concentration that is equal to the soot dopant concentration is deposited. Then the next step may involve a heat treatment. A collapsing step takes place in an additional step; and then the bather layer is removed. Finally a closing step is executed.

The purpose of the method is to keep the dopants that are present in the deposited soot layer from diffusing from the consolidated layer or more specifically the created core during the subsequent heat intensive collapsing processes of the preform and to prevent the respective decrease in the dopant concentration by covering its surface with the aforementioned barrier layer. Due to the absence of a concentration gradient of the dopants in the core and barrier layer, the net result is in essence no dopant diffusion from the core layer at the interface to the barrier layer and, thus, no decrease in the dopant concentration in the core layer.

One practical embodiment of the method provides that after the deposition of the doped soot layer, a solution doping with a halogenide of an element of the third and/or fifth main group and/or a halogenide of an element of the rare earths is carried out.

It is advantageous for the soot dopant and the barrier dopant to be identical. Then the interface between the consolidated soot and the barrier layer experiences a diffusion process, wherein the net flow of the dopants between the two layers is equal to zero; and, as a result, the concentration of the dopants remains virtually unchanged in both the deposited and the consolidated soot layer and the barrier layer.

One practical embodiment of the method provides that at least one component, preferably fluorine, diffuses from the at least one intermediate layer and/or barrier layer into the core, so that the chemical composition of the core glass is radially affected at least in certain sections. The overall results are advantageous optical effects, in particular in terms of a reduced numerical aperture of the core or an increased core and/or cladding absorption due to higher Yb concentrations in the subsequent optical fiber.

It is practical to remove the barrier layer by means of a gas phase etching process prior to closing the collapsed and internally coated tube.

BRIEF DESCRIPTION OF THE DRAWINGS

FIG. 6 is a schematic diagram of a refractive index profile at a fiber core covered with a temporary barrier layer before and after removal of the barrier layer.

DETAILED DESCRIPTION OF THE DRAWINGS

The inventive glass fiber and the inventive fabrication method are explained in detail below by means of exemplary embodiments. FIGS. 3 to 6 are intended for purposes of elucidation. The same reference numerals are used for the identical or functionally equivalent parts.

Figure 3:
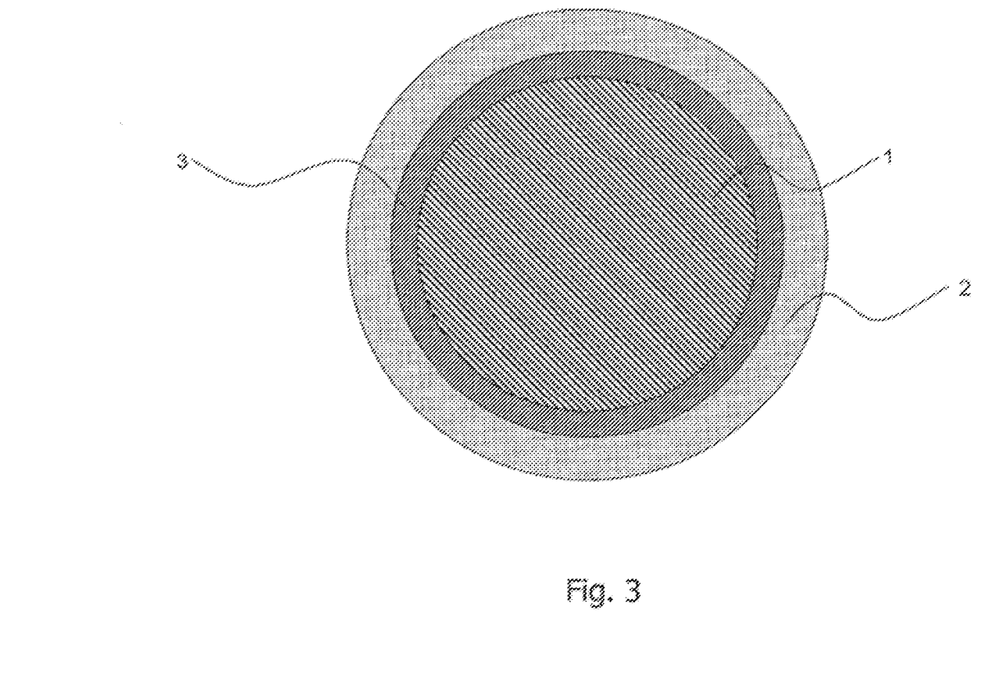
FIG. 3 is a cross sectional view of an exemplary inventive light guide configured as a laser guide.

FIG. 3 shows a cross section of a light guide configured as a laser guide. This light guide comprises a glass fiber core 1, a cladding 2 enclosing the glass fiber core, and an intermediate layer 3, disposed between the glass fiber core and the cladding. In this example, the thickness of the cladding is highly diminished for reasons relating to a better overview. In real optical fibers or laser fibers the cladding has a thickness exhibiting a value that matches at least approximately the size of the radius of the glass fiber core. The optical density and, thus, the refractive index decreases from the glass fiber core in the direction of the cladding.

The intermediate layer is expediently doped in such a way that in the transition area, which is formed by this intermediate layer and located between the relatively highly doped core and the undoped cladding area, the mechanical stresses generated between the core and the cladding are not suddenly transferred, but rather transferred step by step and, as a result, are reduced. However, the doping of the intermediate layer may not disrupt the guiding of the light in the laser core. This requirement is satisfied by compensating for the increase in the refractive index of the intermediate layer doping, which is used, by means of an additional co-doping with a refractive index reducing dopant—$SiO_{1.5}F$ or $B_2O_3$. However, in this case the described reduction in the mechanical stresses is largely retained.

Figure 4:
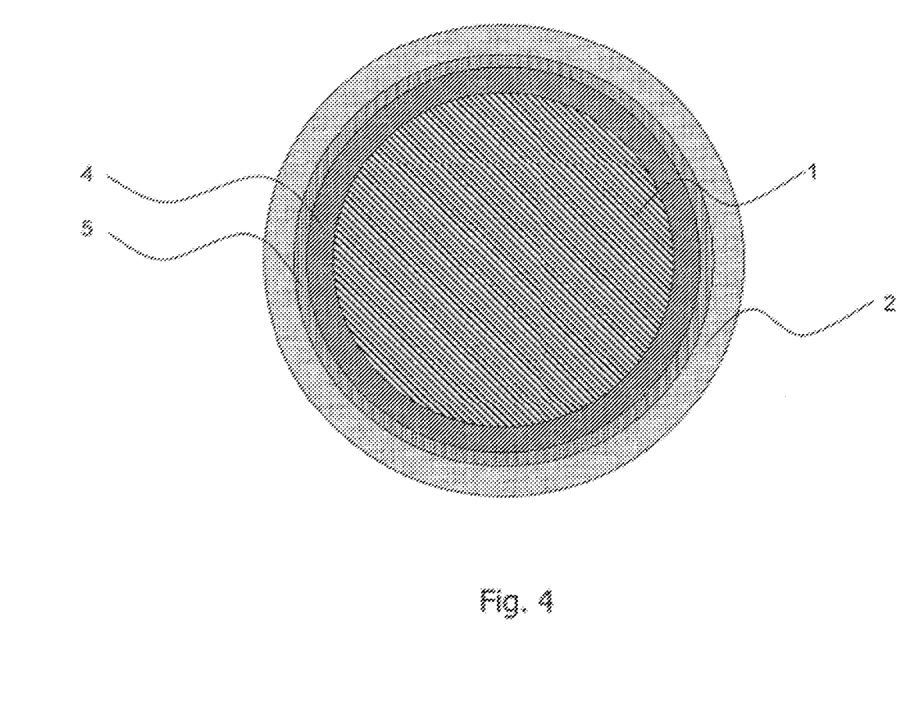
FIG. 4 is a cross sectional view of an exemplary light guide, which is configured as a laser guide and has two intermediate layers.

In order to reduce the stresses in the core/cladding interface, multiple intermediate layers can also be inserted between the core and the cladding. Such an example is shown in FIG. 4. The fiber cross section that is depicted in this case has a first intermediate layer 4 and a second intermediate layer 5. The thickness of the cladding in this illustration is also drastically diminished for reasons relating to a better overview.

The intermediate layers are doped in such a way that the values for their thermal expansion coefficients lie between a higher coefficient of expansion of the glass fiber core 1 and a comparatively lower coefficient of expansion of the undoped pump core or the outer cladding 2. In order not to disrupt the wave guidance of the laser core, the intermediate layers must also be co-doped in such a way that the refractive index of each intermediate layer resulting from the ratio between the doping and the co-doping is equal to the refractive index of the material of the cladding 2. In such a case the intermediate layers form optically a part of the cladding, whereas the optically active cross sectional area of the core remains unaffected.

Figure 5:
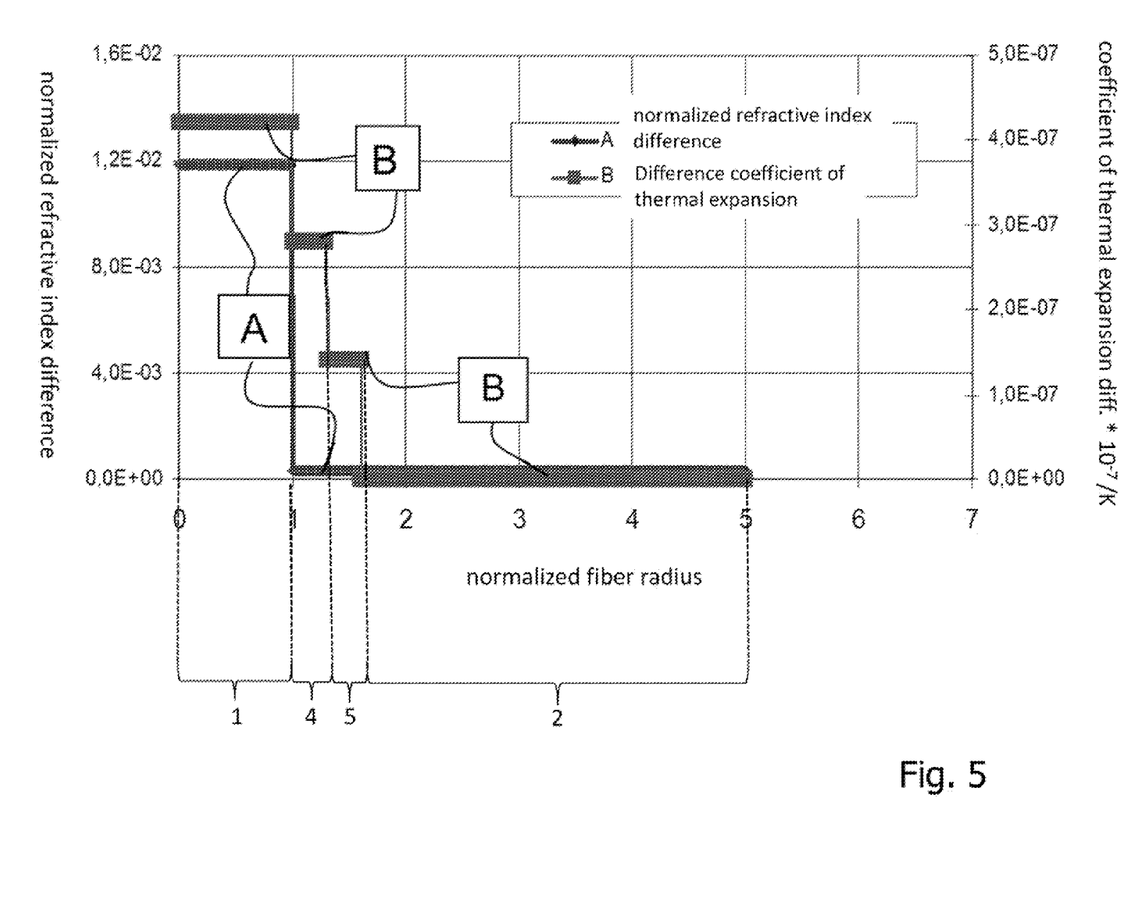
FIG. 5 is a schematic diagram of a normalized refractive index difference of the glass fiber core, the adjoining intermediate layers, and the difference of the thermal expansion coefficient of the glass fiber core and the intermediate layers in comparison to the cladding.

FIG. 5 shows a schematic profile of the normalized refractive index as a function of a radius r/a, which is normalized with respect to the core radius a, in a corresponding laser fiber having two intermediate layers in the area of the fiber core ($r/a \leq 1$) and the adjoining intermediate layers 4 and 5 ($1 \leq r/a \leq 1.6$) as well as the difference between the thermal expansion coefficient of the glass fiber core and the intermediate layers relative to that of the cladding 2 made of undoped $SiO_2$. The curve A shows that both intermediate layers 4 and 5 have the refractive index of the cladding 2, whereas their thermal expansion coefficients decrease step by step in the direction of the cladding, so that their values lie between those of the glass fiber core 1 and the cladding 2, as shown by the curve B.

The glass fiber core of the laser fiber is made, for example, of the follow dopants:
1. a rare earth element in the form of ytterbium III oxide $Yb_2O_3$) in a concentration of 0.5 mol %,
2. aluminum III oxide ($Al_2O_3$) as a solubilizer and for improving the photodarkening behavior of the laser fiber in a concentration of 4 mol % and The following table shows by way of example the contribution of the core dopants and their concentrations for the glass fiber core to the normalized refractive index difference with respect to the undoped cladding:

| Core dopant | Refractive index difference per mol % | Dopant concentration in mol % | Contribution to the core refractive index difference |
|---|---|---|---|
| $Yb_2O_3$ | $67 \times 10^{-4}$ | 0.5 | $33.5 \times 10^{-4}$ |
| $Al_2O_3$ | $21.3 \times 10^{-4}$ | 4.0 | $85.2 \times 10^{-4}$ |
| | | total | $118.7 \times 10^{-4}$ |

For the resulting difference between the thermal expansion coefficient (CTE) of the glass fiber core CTE (core) and the thermal expansion coefficient CTE ($SiO_2$) of the cladding the following value is calculated with the following equation with the variables x and y for the respective dopant concentrations in the glass fiber core with respect to the undoped cladding:

$CTE(\text{core}) - CTE(SiO_2) = x \cdot CTE(Yb_2O_3)/\text{mol \%} + y \cdot CTE(Al_2O_3)/\text{mol \%} = 0.5 \text{ mol \%} \cdot 4.1 \cdot 10^{-7}/(K \cdot \text{mol \%}) + 4.0 \cdot 0.53 \cdot 10^{-7}/(K \cdot \text{mol \%}) = 4.2 \cdot 10^{-7}/K$ This resulting CTE difference between the glass fiber core and the undoped cladding is now expediently split between the two intermediate layers 4 and 5. For the innermost first intermediate layer 4 a value of, for example, $2.8 \times 10^{-7}/K$ is selected; for the second intermediate layer a value of $1.4 \times 10^{-7}/K$ is selected.

In the next step both the intermediate layer dopants, the concentration of the intermediate layer dopants, the intermediate layer co-dopants and the concentrations of the intermediate layer co-dopants have to be determined for each of the intermediate layers 4 and 5 in such a way that, on the one hand, the resulting refractive index difference of each intermediate layer disappears with respect to the refractive index of the cladding and, on the other hand, the respective necessary CTE difference is achieved in each layer. At the same time it must be observed that the $Yb_2O_3$ doping contained in the glass fiber core may not be contained in any of the intermediate layers.

For the glass system of the intermediate layers 4 and 5 a doping of, for example, $P_2O_5$ is selected as the intermediate layer dopant; and $SiF_4$ is selected as the refractive index correcting intermediate layer co-dopant. The reason for this approach lies in the fact that $P_2O_5$ yields an adequately high percentage of the CTE of the intermediate layer at relatively low concentrations; and $SiF_4$ can be used advantageously as the refractive index reducing dopant for compensating for the refractive index increase caused by the $P_2O_5$ component.

At this point the intermediate layer dopant concentration x1 and the intermediate layer co-dopant concentration y1 for the intermediate layer 4 and/or the intermediate layer dopant concentration x2 and the intermediate layer co-dopant concentration y2 for the intermediate layer 5 are obtained for each intermediate layer from the following equation systems: for the inner first intermediate layer 4:

$x1 \cdot dn(P_2O_5)/\text{mol \%} + y1 \cdot dn(SiF_4)/\text{mol \%} = 0$ $x1 = -(y1 \cdot dn(SiF_4)/dn(P_2O_5)$ $x1 \cdot CTE(P_2O_5)\text{mol \%} + y1 \cdot CTE(SiF_4)/\text{mol \%} = 2.8 \cdot 10^{-7}/K$ at x1=1.97 mol % and y1=0.35 mol %,
and for the second intermediate layer 5:

$x2 \cdot dn(P_2O_5)/\text{mol \%} + y2 \cdot dn(SiF_4)/\text{mol \%} = 0$ $x2 \cdot CTE(P_2O_5)\text{mol \%} + y2 \cdot CTE(SiF_4)/\text{mol \%} = 1.4 \cdot 10^{-7}/K$ at x2=0.99 mol % and y2=0.17 mol %.

The equation systems that apply to each intermediate layer take into consideration that, on the one hand, the contributions of the refractive index reducing co-dopants have to be selected for each intermediate layer in such a way that they cancel out the refractive index increasing effect of the respective dopants in the respective intermediate layer in such a way that the refractive index difference in each intermediate layer with respect to the cladding disappears. On the other and, the partial differences of the thermal expansion coefficient that is to be achieved for each intermediate layer are entered into the equation as the parameters.

Such a configured laser fiber with intermediate layers that are doped in a particular way for use in the high power range is distinguished by a number of advantages.

First of all, the mechanical stresses, which are generated by the high temperature gradients at the core/cladding interface at high laser outputs in the kW range, and can lead to the destruction of the laser fiber, are reduced by the specifically doped intermediate layers until the laser fiber will not be destroyed. The wave guidance of the laser radiation in the fiber laser core is not disrupted by the adjustment of the refractive index of the intermediate layers with respect to the undoped cladding area.

Secondly the high mechanical stresses in the core/cladding area are already reduced during the hot temperature steps of the preform and fiber fabrication to the point that the core does not show any microscopic or macroscopic cracks during the cooling process. Otherwise the cracks in the fiber core would reduce the power radiation due to the scattering in the core and significantly decrease the obtainable laser power.

In addition, the laser radiation scattered from the core would be absorbed in the polymer coating. In this case the temperature of the coating material rises; the coating material degrades and, in so doing, leads to the destruction of the coating material and, with it, the laser fiber. Due to the reduction in mechanical stresses during the preform and fiber fabrication, the crystallization tendency of the preform and/or fiber core that is generally highly doped is also reduced.

The aforementioned intermediate layer can also be applied on the glass fiber core only temporarily in the course of the fabrication process of the optical fiber. In such a case the intermediate layer acts as a barrier layer that prevents the dopants and co-dopants that are contained in the glass fiber core—in particular, phosphorus P or more specifically $P_2O_5$—from diffusing out, gassing out or vaporizing. This feature is especially important for the photodarkening behavior of the glass fiber, because a homogeneous dopant content that remains constant during the glass fiber fabrication predominantly counteracts the photodarkening in the glass fiber core that is doped with a rare earth element.

However, the intermediate layers also have an additional function that is very important. By applying intermediate layers around the rare earth doped layer it is possible to change the chemical composition in a targeted manner by diffusion processes.

For high power fiber lasers a high concentration of the laser active medium—Yb in the present advantageous embodiment—is necessary in the core. However, doping with Yb increases the refractive index of the core. In the so-called large mode area fibers (LMA fibers), wherein the optical output can be divided over a larger core, especially high optical power densities can be transported. However, for an efficient light conductance in such LMA fibers, it is necessary that the difference between the core and the cladding refractive index be as small as possible. Therefore, the need for a high Yb concentration in the core stands in stark contrast to the need for a minimum refractive index difference.

However, it has been demonstrated that fluorine doped intermediate layers offer an elegant solution to this problem. Incorporating fluorine into the active core in order to compensate for the refractive index increase due to the laser active element is a common practice. However, a direct doping of the laser medium with fluorine is problematic due to the formation of readily volatile compounds, like $YbF_3$, $AlF_3$ and/or $PF_3$, which leave the core when the layers are fused. Therefore, the incorporation of fluorine by this method is extremely limited.

Surprisingly it has been demonstrated that a significantly higher concentration of fluorine in the core is possible, if at least one, advantageously two, fluorine containing intermediate layers are deposited on both the outer and the inner interface of the active core. As a result, the layer that contains the laser medium and that forms the active core following consolidation is enclosed by these intermediate layers on both sides. As a consequence of the additional temperature treatment steps—and/or—processing steps, advantageously the collapsing process, the fluorine is diffused into the core layer containing the laser medium. The volatile compounds, such as $YbF_3$, $AlF_3$ or the like, cannot be formed and/or can no longer leave this layer. The inner intermediate layer is removed in the course of the last collapsing step, prior to the closing of the coated tube.

With this strategy it is possible to significantly increase the fluorine concentration in the active core and, in so doing, increase the Yb concentration without increasing the refractive index. This method is not limited to the example of Yb and fluorine, but rather can be used in an analogous manner by the person skilled in the art with other combinations of elements.

For illustrative purposes the fabrication steps for making a preform for the optical fiber to be produced are described below. In this case the sequence starts with the glass fiber core that is to be created and that consists of a silicon oxide matrix with a doping of ytterbium III oxide and a co-doping of aluminum III oxide and diphosphorus pentoxide.

In a first fabrication step a porous soot layer composed of a silicon oxide layer that is doped with diphosphorus pentoxide is deposited. After the deposition of the soot layer and adjustment of a defined degree of sintering, a solution doping with aluminum chloride and ytterbium chloride is carried out on the layer. For example, to this end, an immersion method is used. In this case the layer is dipped either one after the other into a first solution with aluminum chloride and then into a second solution with ytterbium chloride or is exposed to a mixed solution of both substances.

Then the deposited soot layer that is doped in this way is oxidized. At the same time the aluminum chloride and the ytterbium chloride contained in the soot layer transform into aluminum III oxide or ytterbium III oxide respectively. The resulting layers doped with the oxides are then consolidated inside the deposited soot layer. As a result, the specifically doped layer is transformed into a core layer.

Immediately after the consolidation, the temporary barrier layer is deposited on the core layer. This step is performed; for example, by a process of a modified chemical gas phase deposition (MCVD), during which an additional transparent silicon oxide layer doped with diphosphorus pentoxide is applied. In principle, this process can be carried out in the MCVD deposition system that had been used previously. The important aspect of this feature is that the concentration of diphosphorus pentoxide in the layer that is to be deposited at this point is equal to the concentration of the diphosphorus pentoxide in the core layer, in order to eliminate any concentration gradient at the interface between the core layer and the newly applied barrier layer. Then the barrier layer acts as a barrier layer that prevents the diphosphorus pentoxide or rather the phosphorus from diffusing from the core layer into the intermediate layer during the hot temperature steps that are carried out thereafter.

At this point the additional fabrication steps that are necessary to manufacture the preform are carried out at the core layer that is covered with the barrier layer.

This involves, in particular, a collapsing step. During the collapsing process the diphosphorus pentoxide or rather the phosphorus contained in the intermediate layer diffuses from the exposed surface of the barrier layer into the environment, whereas the concentration of this dopant remains constant at the interface between the core and the intermediate layer.

However, the barrier layer can be removed per se at any time. In the present example the intermediate layer is removed by a gas phase etching process immediately before the closing of the preform. As a result, the core, which is unaffected by the diffusion and vaporization effect, is exposed again.

During the closing process the inner surface of the core is adequately small, so that only insignificant residual quantities of diphosphorus pentoxide or rather phosphorus can diffuse and vaporize from the core layer. In this case the concentration of the dopant in the core changes only insignificantly.

The use of at least one barrier layer and the removal of the barrier layer before the closing step of the preform makes it possible to hold the diphosphorus pentoxide content, which determines the photodarkening effect, in the core of the preform at a constant concentration over the core radius. As a result, the photodarkening behavior of the optical fiber is significantly improved, especially when it is used as a laser fiber. In addition, the refractive index profile of the core is enhanced chiefly in terms of a graduated profile of the refractive index between the glass fiber core and the surrounding cladding and/or between the glass fiber core and the above described permanent and stress compensating intermediate layer that may or may not be applied later. At the same time this strategy makes it possible to achieve an improved length equivalence of the refractive index of the core.

FIG. 6 elucidates in detail the aforesaid by means of two refractive index profiles shown as schematic diagrams. The left diagram shows a refractive index profile of a core with a radius R and a barrier layer that is applied thereon and has a thickness D after the collapsing and closing of the preform. The light adjacent diagram shows a refractive index profile after the removal of the barrier layer.

In the left diagram the refractive index falls continuously in the direction of the edge of the barrier layer as a result of the vaporization of the dopant over the thickness of the barrier layer.

Following removal of the barrier layer, the area in this layer in which the refractive index continuously decreases is cut off. Consequently the resulting exposed core exhibits a steep decline in the refractive index at its inner interface. Hence, the refractive index profile of the core begins to resemble a rectangular profile, which is ideal for the light guidance.

The inventive optical fiber and the inventive fabrication method of an optical fiber were explained in detail by means of examples. Additional embodiments are possible based on the standard procedure of a person skilled in the art. These embodiments are readily apparent, in particular, from the dependent claims.

LIST OF REFERENCE NUMERALS 1 glass fiber core
2 cladding
3 intermediate layer
4 first intermediate layer
5 second intermediate layer

The invention claimed is:

1. An optical fiber, comprising:
a doped glass fiber core including a core dopant;
a cladding enclosing the doped glass fiber core, with a refractive index profile that decreases outwards from the fiber core; and
an intermediate layer that is disposed between the doped glass fiber core and the cladding, wherein the intermediate layer is configured to reduce mechanical stresses between the doped glass fiber core and the cladding, the intermediate layer including an intermediate layer dopant, and a concentration of the intermediate layer dopant in the intermediate layer is the same as a concentration of the core dopant in the doped glass fiber core to prevent net loss of the core dopant from the doped glass fiber core due to diffusion.

2. The optical fiber according to claim 1, wherein the intermediate layer is configured to have a graduated mechanical stress profile between the doped glass fiber core and the cladding; and the intermediate layer has a refractive index reducing intermediate layer co-dopant that counteracts a refractive index increasing effect of the intermediate layer dopant.

3. The optical fiber according to claim 1, wherein the intermediate layer is configured to have a thermal expansion coefficient exhibiting a value ranging between a value of the coefficient of expansion of the doped glass fiber core and a value of a coefficient of expansion of the cladding.

4. The optical fiber according to claim 1, wherein the doped glass fiber core comprises at least one active laser medium, a rare earth element and/or a d-group element, and a solubilizer.

5. The optical fiber according to claim 4, wherein the solubilizer is an oxide of an element of the third main group.

6. The optical fiber according to claim 4, wherein the solubilizer is an oxide of an element of the fifth main group.

7. The optical fiber according to claim 1, wherein the core dopant is ytterbium oxide.

8. The optical fiber according to claim 1, wherein the intermediate layer dopant comprises an oxide of an element of the third and/or the fifth main group.

9. The optical fiber according to claim 1, further comprising a second intermediate layer that is disposed between the first intermediate layer and the cladding,
wherein the values of the thermal expansion coefficients of the first intermediate layer and the second intermediate layer have a graduated profile, and
the first intermediate layer further includes a first intermediate layer co-dopant,
the second intermediate layer includes a second intermediate layer dopant, and a second intermediate layer co-dopant that counteracts a refractive index increasing effect of the second intermediate layer dopant, and
a ratio of the first intermediate layer dopant and the first intermediate layer co-dopant in the first intermediate layer is different from a ratio of the second intermediate layer dopant and the second intermediate layer co-dopant in the second intermediate layer.

10. The optical fiber according to claim 1, further comprising at least one diffusion zone, in which at least one ingredient is diffused into the doped glass fiber core, said at least one diffusion zone being formed between the intermediate layer and the doped glass fiber core.

11. The optical fiber according to claim 10, wherein the concentration of the ingredient exhibits a radial gradient.

12. The optical fiber according to claim 10, wherein the concentration of the ingredient uniformly permeates the doped glass fiber core.

13. The optical fiber according to claim 1, further comprising a diffusion zone, in which at least one ingredient is diffused from the doped glass fiber core, said diffusion zone being formed between the intermediate layer and the doped glass fiber core.

14. The optical fiber according to claim 1, wherein the intermediate layer includes an intermediate layer co-dopant, wherein the intermediate layer co-dopant includes a halogenide.

15. The optical fiber according to claim 14, wherein the intermediate layer dopant comprises an oxide of an element of the third and/or the fifth main group.

16. The optical fiber according to claim 14, wherein the halogenide is fluoride.

17. An optical fiber, comprising:
a doped glass fiber core including a core dopant;
a cladding enclosing the doped glass fiber core, with a refractive index profile that decreases outwards from the fiber core;
a tube-shaped intermediate product that is disposed between the doped glass fiber core and the cladding; and
at least one intermediate layer that is disposed between the doped glass fiber core and an interior of the tube-shaped intermediate product, wherein each of the at least one intermediate layer reduces the mechanical stresses between the doped glass fiber core and the cladding, and the at least one intermediate layer includes a dopant, wherein the concentration of the dopant in the at least one intermediate layer is the same as the concentration of the core dopant in the doped glass fiber core to prevent net loss of the core dopant from the doped glass fiber core due to diffusion.

* * * * *